United States Patent
Leyko et al.

(10) Patent No.: US 10,794,246 B2
(45) Date of Patent: Oct. 6, 2020

(54) HEAT-EXCHANGE AND NOISE-REDUCTION PANEL FOR A PROPULSION ASSEMBLY

(71) Applicant: SAFRAN AIRCRAFT ENGINES, Paris (FR)

(72) Inventors: Matthieu Leyko, Orsay (FR); Imane Ghazlane, Berlin (DE)

(73) Assignee: SAFRAN AIRCRAFT ENGINES, Paris (FR)

( * ) Notice: Subject to any disclaimer, the term of this patent is extended or adjusted under 35 U.S.C. 154(b) by 966 days.

(21) Appl. No.: 15/279,005

(22) Filed: Sep. 28, 2016

(65) Prior Publication Data

US 2017/0089238 A1  Mar. 30, 2017

(30) Foreign Application Priority Data

Sep. 29, 2015  (FR) ..................................... 15 59154

(51) Int. Cl.
*F01N 1/02* (2006.01)
*F01D 25/12* (2006.01)
(Continued)

(52) U.S. Cl.
CPC .............. *F01N 1/023* (2013.01); *B23P 19/00* (2013.01); *B33Y 10/00* (2014.12); *B33Y 80/00* (2014.12);
(Continued)

(58) Field of Classification Search
CPC ......... F01N 1/023; B33Y 10/00; B33Y 80/00; F23M 20/005; B23P 19/00; F01D 25/12;
(Continued)

(56) References Cited

U.S. PATENT DOCUMENTS 3,793,838 A * 2/1974 Nash ....................... F02C 7/222
60/764
5,197,288 A * 3/1993 Newland ................. F02C 7/222
60/734
(Continued)

FOREIGN PATENT DOCUMENTS

EP   2 604 426 A1   6/2013
GB   2476855 A      7/2011

OTHER PUBLICATIONS

Rapport de Recherche Preliminaire / Opinion Ecrite, mailed Aug. 12, 2016, issued in corresponding French Application No. 1559154, filed Sep. 29, 2015, 6 pages.

*Primary Examiner* — Mark A Laurenzi
*Assistant Examiner* — Loren C Edwards
(74) *Attorney, Agent, or Firm* — Christensen O'Connor Johnson Kindness PLLC

(57) ABSTRACT

Heat-exchange and noise-reduction panel for a propulsion assembly, in particular for an aircraft, the panel comprising: a perforated plate comprising a plurality of through-openings; a cellular structure comprising longitudinally oriented structural walls covered by said perforated plate and comprising, between said walls, cavities that define Helmholtz resonators, said through-openings forming necks of said resonators; and means for the circulation of fluid, for example oil, at said perforated plate, wherein said fluid circulation means comprise channels that are formed at least in part in thickened ends of said walls on the same side as said perforated plate, and/or at least in part in regions of the perforated plate situated in the longitudinal extension of said thickened ends.

25 Claims, 3 Drawing Sheets

(51) Int. Cl.
*F02C 7/24* (2006.01)
*F02C 7/045* (2006.01)
*B33Y 10/00* (2015.01)
*B33Y 80/00* (2015.01)
*F23M 20/00* (2014.01)
*B23P 19/00* (2006.01)
*B64D 33/02* (2006.01)

(52) U.S. Cl.
CPC .............. *F01D 25/12* (2013.01); *F02C 7/045* (2013.01); *F02C 7/24* (2013.01); *F23M 20/005* (2015.01); *B64D 2033/024* (2013.01); *B64D 2033/0206* (2013.01); *F05D 2230/53* (2013.01); *F05D 2250/132* (2013.01); *F05D 2250/283* (2013.01); *F05D 2260/204* (2013.01); *F05D 2260/213* (2013.01); *F05D 2260/963* (2013.01)

(58) Field of Classification Search
CPC . F02C 7/045; F02C 7/24; B64D 33/02; B64D 2033/0206; B64D 2033/024; F05D 2230/53; F05D 2250/132; F05D 2250/283; F05D 2260/204; F05D 2260/213; F05D 2260/963; F28F 3/046; F02K 1/827
USPC ............................................................. 60/725
See application file for complete search history.

(56) References Cited

U.S. PATENT DOCUMENTS

| | | |
|---|---|---|
| 5,445,861 A | 8/1995 | Newton et al. |
| 6,497,550 B2* | 12/2002 | Booth .................. F01D 21/045 |
| | | 415/173.4 |
| 2002/0179773 A1 | 12/2002 | Breer et al. |
| 2005/0284690 A1* | 12/2005 | Proscia .................. F02C 7/045 |
| | | 181/214 |
| 2007/0102235 A1* | 5/2007 | Tobik ........................ F01N 1/02 |
| | | 181/250 |
| 2010/0206664 A1* | 8/2010 | Bagnall .................. F02C 7/045 |
| | | 181/214 |
| 2013/0146393 A1 | 6/2013 | Porte et al. |
| 2015/0276223 A1* | 10/2015 | Benson .................. F01D 25/28 |
| | | 60/752 |

* cited by examiner

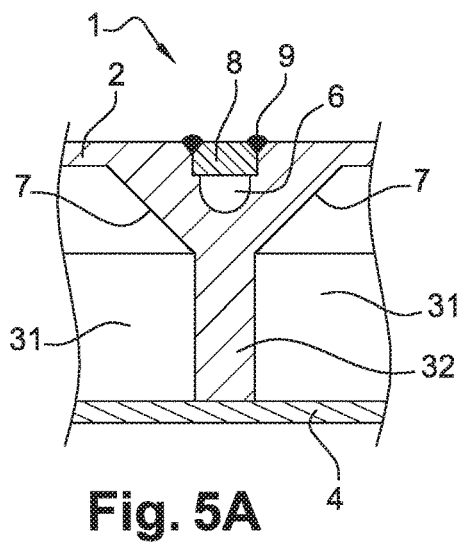
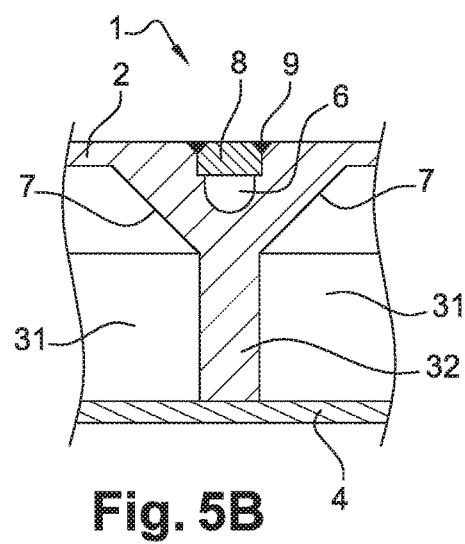
Fig. 5A  Fig. 5B
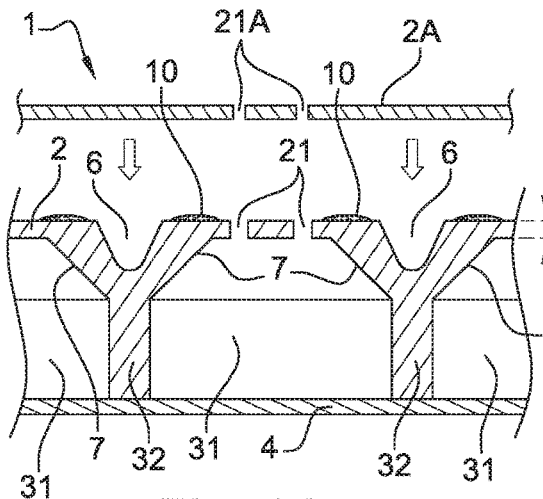
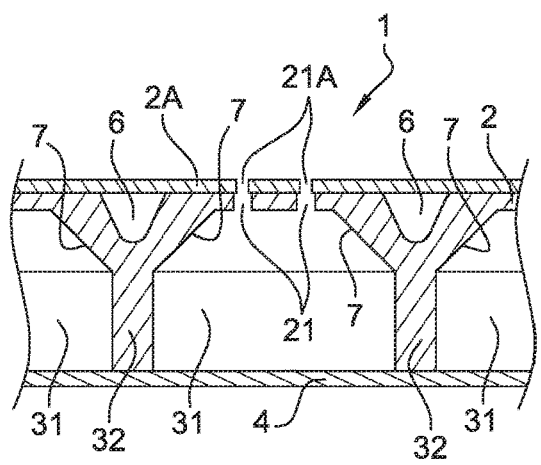
Fig. 6A  Fig. 6B
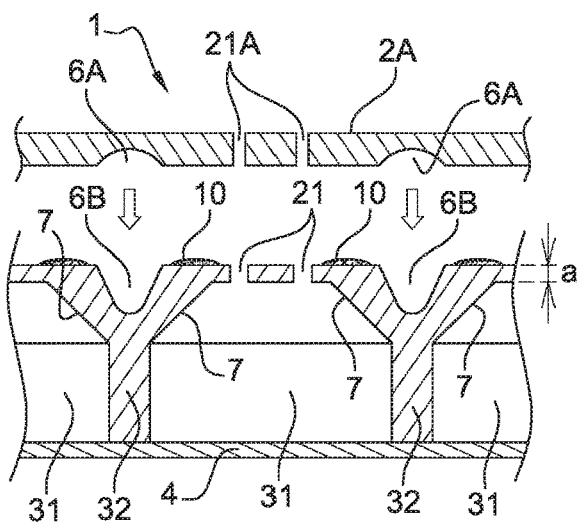
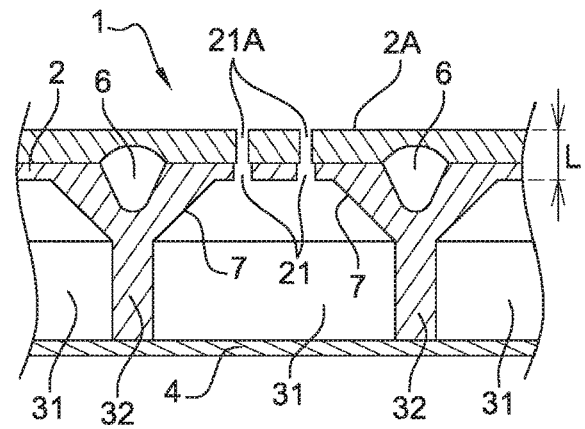
Fig. 7A  Fig. 7B

HEAT-EXCHANGE AND NOISE-REDUCTION PANEL FOR A PROPULSION ASSEMBLY

FIELD OF THE DISCLOSURE

The present disclosure relates to a heat-exchange and noise-reduction panel for a propulsion assembly, in particular for an aircraft. The present disclosure also relates to a propulsion assembly provided with said panel, and to a method for manufacturing said panel.

BACKGROUND OF THE DISCLOSURE

An aircraft turbine engine conventionally comprises, from upstream to downstream, in the direction of flow of the gases, at least one compressor module intended to compress an airflow, an annular combustion chamber in which the compressed airflow is mixed with fuel and then burnt, and at least one turbine module in which the combustion gas flow is expanded in order to drive a turbine shaft.

The turbine engine in general comprises, at its upstream end, a fan comprising an impeller that is intended to compress an airflow entering the turbine engine via a primary duct, this airflow dividing downstream of the fan into a primary flow supplying the compressor module and intended to produce the aforementioned combustion gas flow, and a secondary flow intended to flow in a secondary duct around the turbine engine and inside a nacelle.

Moreover, the turbine engine is provided with a system for the circulation of fluid, for example oil, which fulfils the dual task of lubricating the rotating parts and discharging the calories released in the engine in the form of heat. Current studies on future engines show that there is a trend towards an increase in the overall temperature of the engine. Because of this, the quantity of heat to be discharged is, in these applications, much greater than in the case of conventional engines.

To cool the fluid, for example oil, the temperature of which must not exceed a predetermined temperature, for example around 200° C., for reasons of efficiency various types of heat exchangers exist. Some of them use air as a cold source.

The main air/fluid exchanger techniques currently used in engines are:
- a cooling unit directly situated in the secondary duct,
- a cooling unit supplied with air by means of a takeoff of air in the secondary duct, which involves the use of an air takeoff scoop and air outlet,
- a cooling device in which heat-conductive metal surfaces, in contact with the fluid to be cooled, are placed in the secondary duct where the air/metal interface serves as a heat-discharge region, this device generally being fitted with fins in order to obtain the exchange surface necessary for cooling.

The first two techniques have the drawback of giving rise to significant pressure drops. As for the last technique, it assumes the presence of a large exchange surface, which is also constraining. In addition, the use of large exchange surfaces may lead to reducing the acoustic treatment surface and therefore degrading the acoustics of the engine.

Moreover, in the context of the aforementioned last technique, adding heat exchange surfaces in the airflow is generally intrusive, in particular because of the fins that project into the flow, which is detrimental in terms of aerodynamic performance. In order to avoid or at least limit the addition of heat exchange surfaces to the detriment of acoustic treatment surfaces in the secondary duct, it is known to arrange means for circulation of the liquid to be cooled in an acoustic attenuation panel. The current solutions in this regard do however generally result in insufficient cooling of the fluid, or a reduction in aerodynamic performance due to the intrusion of a large surface area of fins in the flow.

SUMMARY OF THE DISCLOSURE

Embodiments of the present disclosure aims to remedy these drawbacks by proposing a heat-exchange and noise-reduction panel for a propulsion assembly, in particular for an aircraft, which, in an optimum manner, incorporates a system for the circulation of fluid, in particular oil, in an acoustic-attenuation system.

Embodiments of the present disclosure thus relates to a heat-exchange and noise-reduction panel for a propulsion assembly, in particular for an aircraft, the panel comprising:
- a perforated plate comprising a plurality of through-openings,
- a cellular structure comprising longitudinally oriented structural walls covered by said perforated plate and comprising, between said walls, cavities that define Helmholtz resonators, said through-openings forming necks of said resonators, and
- means for the circulation of fluid, for example oil, at said perforated plate.

In the panel according to an aspect of the present disclosure, said fluid circulation means comprise channels that are formed at least in part in thickened ends of said walls, on the same side as said perforated plate, and/or at least in part in regions of the perforated plate situated in the longitudinal extension of said thickened ends.

In the present application, Helmholtz resonator means an acoustic system comprising a neck, in general of small size, connected to a cavity that is of a larger size and is able to resonate. The neck provides communication between the sound waves to be attenuated and the cavity. Once the system is optimized, the neck provides the viscothermal dissipation (rapid alternating movements of the sound waves through the necks that dissipate the sound energy by friction). The frequency tuning, that is to say the optimization that makes it possible to generate these maximum speeds at the frequencies to be attenuated, is achieved mainly by the volume of the resonant cavities, that is to say their dimensions and in particular their height. It will be stated that, in the light of the thermal environment, the local temperatures can be taken into account in order to optimize the system correctly.

Thus, advantageously, the specific arrangement of the channels makes it possible to effectively integrate the fluid circulation means in the acoustic-treatment structure while ensuring good cooling of the fluid and good acoustic attenuation. In particular, it is possible to benefit from the depth of material offered by the walls in order to form a narrowing of the cross section of the cavities over part of their height, on the same side as the perforated plate, so as to form, between the cavities, regions of thickened material having a flared cross section in and/or on which ("on" means in the longitudinal extension of the thickened ends of the walls, i.e. in regions facing the thickened ends) recesses can be created forming the fluid circulation channels.

The external surface of the perforated plate, that is to say the surface of the plate situated on the side opposite to the cellular structure, is typically intended to be swept by an airflow.

The channels may be formed in part by grooves opening towards the outside of the cellular structure and produced at least in part in the thickened ends of said walls.

The cellular structure and at least part of the perforated plate may be formed in a single piece.

An internal layer of the perforated plate may be formed in a single piece with the cellular structure, and the perforated plate may comprise a perforated external layer that is fixed, for example by adhesive bonding or brazing, to said internal layer and which comprises openings aligned with those in said internal layer. In this case, the channels may be formed in part in the thickened ends of the walls and in part in the portions of the bottom layer and/or of the top layer situated in a longitudinal extension of the thickened ends of the walls.

The perforated plate may be formed by a perforated external plate that is fixed, for example by adhesive bonding or brazing, to the cellular structure. In this case, the channels may be formed in part in the thickened ends of the walls and in part in the portions of the perforated external plate situated in a longitudinal extension of the thickened ends of the walls.

Said perforated external layer, or said perforated external plate, may comprise grooves that face the cellular structure and are designed to define at least a portion of said channels.

The grooves forming the channels may be closed by attached elements that are fixed to the thickened ends of said walls, on the side opposite to said structure.

The attached elements may comprise inserts that are engaged in the channels and fixed to the perforated plate, for example by welding.

Said perforated external layer, or said perforated external plate, may be produced from a flexible material, preferably heat-conducting, and/or a metal material.

Embodiments of the present disclosure also relates to a propulsion assembly comprising at least one panel described above.

Embodiments of the present disclosure also relates to a method for manufacturing a panel described above. The method comprises the formation of channels, at least in part in thickened ends of said walls, on the same side as said perforated plate, and/or at least in part in regions of the perforated plate situated in the longitudinal extension of said thickened ends.

The method may comprise the formation of the perforated plate and of the cellular structure in a single piece, by additive manufacturing, and the formation of channels in the thickened ends of said walls during the additive manufacturing.

The method may comprise the steps consisting of:
forming the perforated plate and the cellular structure in a single block, for example by machining a block of material,
producing channels, by removal of material, on a face of the plate situated on the opposite side to the cellular structure, and
attaching or fixing to said plate one or more elements for closure of the channels.

BRIEF DESCRIPTION OF THE DRAWINGS

Embodiments of the present disclosure will be better understood and other details, features and advantages thereof will emerge from reading the following description, given by way of non-limitative example and with reference to the accompanying drawings, in which:

FIGS. 5A and 5B are detailed cross-sectional views illustrating two steps of manufacture of a fluid circulation channel in a panel from FIG. 3;

FIGS. 6A and 6B are detailed cross-sectional views of another embodiment illustrating two steps of manufacture of a fluid circulation channel in a heat-exchange and noise-reduction panel according to an aspect of the present disclosure;

FIGS. 7A and 7B are detailed cross-sectional views of yet another embodiment illustrating two steps of manufacture of a fluid circulation channel in a heat-exchange and noise-reduction panel according to an aspect of the present disclosure;

DETAILED DESCRIPTION OF THE DISCLOSURE

Figure 1:
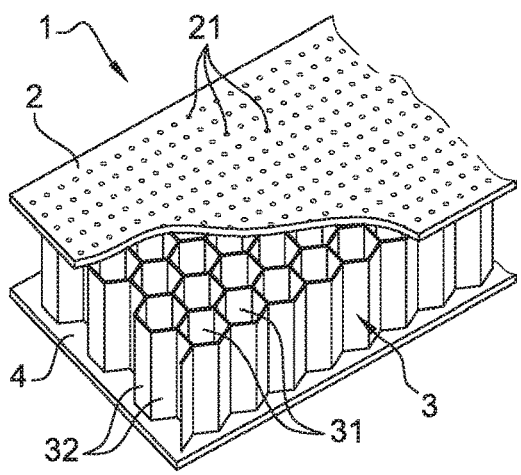
FIG. 1 is a general perspective view of a heat-exchange and noise-reduction panel according to an aspect of the present disclosure, in a single-layer design.

As illustrated in FIG. 1, a heat-exchange and noise-reduction panel 1 for a propulsion assembly according to an aspect of the present disclosure comprises a perforated plate 2 comprising a plurality of through-openings 21, a cellular structure 3 covered by the wall 2, and a support 4 on which the cellular structure 3 is arranged. The support 4 may for example be an air inlet casing or a fan casing of the turbine engine. The cellular structure 3 comprises cavities 31 that define Helmholtz resonators and in which the openings 21 that form necks of the resonators emerge. The cellular structure 3 is typically in honeycomb form, the walls 32 of the structure 3 delimiting cavities 31 roughly hexagonal in shape. Other polygonal geometric structures formed by the walls 32 can, however, be envisaged. The walls 32, longitudinally oriented, may extend substantially perpendicularly to the plate 2. The panel 1 also comprises means for circulation of fluid, typically oil or a heat-transfer fluid (not visible in FIGS. 1 and 2) which are situated level with the perforated plate 2. The external surface of the perforated plate 2, that is to say the surface of the plate 2 situated on the side opposite to the cellular structure 3, is intended to be swept by an airflow that will cool the fluid. The heat-exchange and noise-reduction panel 1 may advantageously be arranged in a nacelle of the propulsion assembly, in particular in the secondary duct and in the air inlet.

Figure 3:
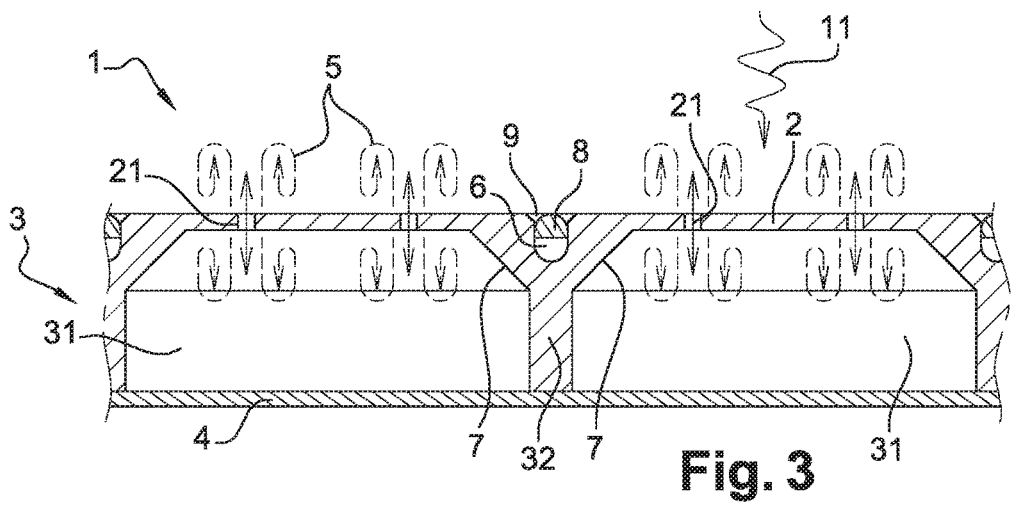
FIG. 3 is a partial cross-sectional view of a representative embodiment of a panel according to an aspect of the present disclosure.

In the panel 1, the principle of attenuation of the noise is based on the generation of vortices 5 caused by an acoustic wave 11 (FIG. 3). It is the vortices 5 that make it possible to attenuate the acoustic energy. Said vortices are generated alternately on the inside and outside of the openings 21 by the overpressure/negative pressure caused by the wave and on each side of the plate 2.

Figure 2:
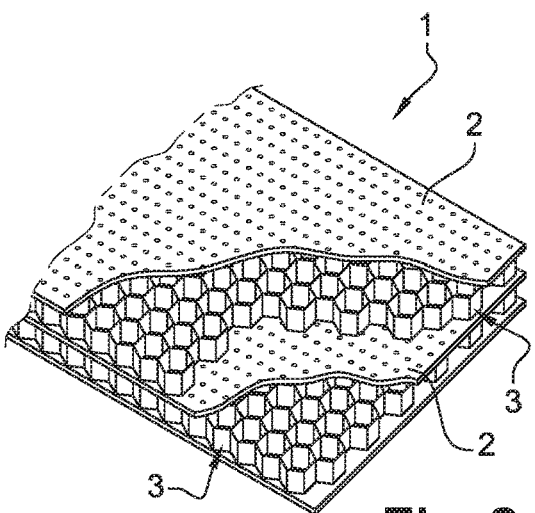
FIG. 2 is a general perspective view of a heat-exchange and noise-reduction panel according to an aspect of the present disclosure, in a multilayer design.

In a variant illustrated in FIG. 2, the panel 1 may comprise a plurality of cellular layers 3, for example two cellular layers 3.

In accordance with an aspect of the present disclosure, the fluid circulation means comprise channels that are formed at least in part in thickened ends of the walls and/or at least in part in regions of the perforated wall situated in the longitudinal extension of the thickened ends.

FIG. 3 illustrates a first embodiment of the oil circulation channels. In this embodiment, the walls 32 of the cellular structure 3 and the entire perforated plate 2 are formed in a single piece, which has the advantage of making the assembly robust.

The ends of the walls 32 situated on the same side as the plate 2 are thickened, for example by forming a bevel 7 under the plate 2 and on each side of the walls 32. Each wall 32 may thus comprise, at its end situated on the same side as the plate 2, a portion in which its thickness increases in the direction of the plate 2, preferably substantially symmetrically with respect to the longitudinal symmetry plane of the wall 32. Each wall 32 may in particular comprise a top portion having a cross section substantially in the form of an isosceles trapezium.

Each channel 6 is then formed in this thickened portion and in the perforated plate 2, above the thickened portion, substantially in the longitudinal extension of the wall 32 of the cellular structure 3. The symmetry plane of each channel 6 is advantageously the same as the symmetry plane of the wall 32 facing which it is situated.

Thin openings 21 are thus obtained, that is to say having the smallest thickness of the plate 2, and a thickness of the channel 6 that is sufficiently great to be easily machinable and integratable. Inserts 8 are advantageously engaged in the channels 6, so as to close off the channels 6. The inserts 8 are fixed to the plate 2, for example by a weld 9. By virtue of the arrangement of the channels 6 in the thickness of the plate 2, the channels 6 are situated in the vicinity of the airflow, which provides good heat exchange between the air and the fluid.

Figure 4A:
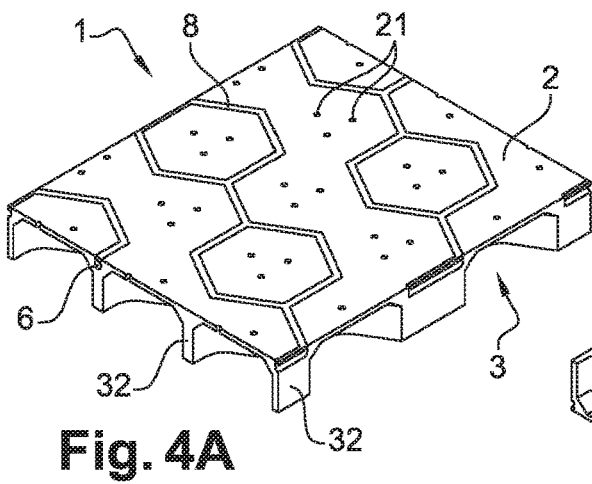
FIG. 4A is a detailed perspective view from above of the panel in FIG. 3.
Figure 4B:
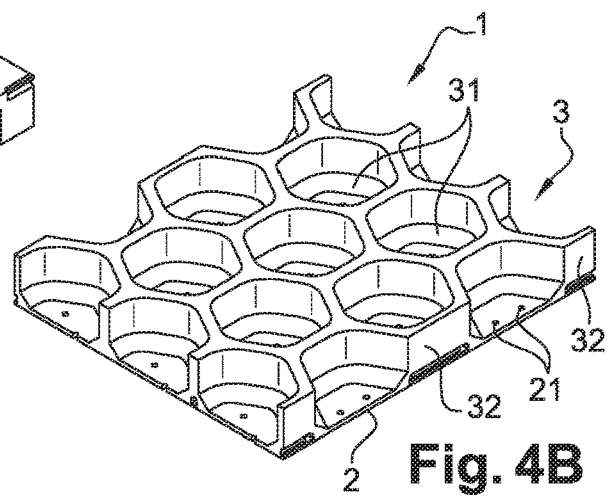
FIG. 4B is a detailed perspective view from below of the panel in FIG. 3.

FIGS. 4A and 4B, in which the elements identical to those in FIG. 3 bear the same reference numbers, are views of the top part of the panel 1 from above and below, respectively, in accordance with the first embodiment.

FIGS. 5A and 5B illustrate two steps of manufacturing a fluid circulation channel 6, in accordance with the first embodiment. The entire plate 2 and the walls 32 of the acoustic-attenuation layer may be formed in a single machined metal block, typically aluminum. Each acoustic cavity 31 may be hollowed out at its top end by means of a conical milling cutter to create the bevel 7 in which the fluid circulation channel 6 is integrated. The channel 6 may also be created by milling on the side of the surface of the plate 2 that is swept by an airflow. An insert 8, for example in the form of a metal blade, is next housed in the top part of the channel 6 in order to close it (FIG. 5A). The blade 8 and its housing are beveled on the top in order to leave the volume necessary for the welding bead 9. The welding 9 is next planed, for example by milling or grinding, in order to obtain a smooth surface (FIG. 5B).

In a second embodiment, as illustrated in FIGS. 6A and 6B, apart from the perforated plate 2 belonging to the piece formed having the cellular structure 3, a second perforated plate 2A is used, which is fixed to the plate 2, for example by means an adhesive 10 or by brazing. The second perforated plate 2A may be produced from a flexible material that has good heat-exchange capability and is resistant to heat and oil in the case where the fluid used is oil. The assembly of the two perforated plates 2 and 2A forms a unit considered to be a single perforated plate, or global perforated plate, comprising an internal layer 2 and an external layer 2A. It is therefore considered that the internal layer of the global perforated plate is formed in a single piece with the cellular structure 3.

The second plate 2A, that is to say the external layer of the global perforated plate, is provided with openings 21A that are superimposed and aligned with the openings 21 of the internal layer formed by the plate 2. The necks of the Helmholtz resonators are thus formed both in the openings 21 and in the openings 21A. Each channel 6 is formed in the thickened portion of the wall 32 and in the perforated plate 2, above the thickened portion, in the longitudinal extension of the wall 32.

In this second embodiment, the fluid circulation channels 6 are created by milling and their top part is closed by the second plate 2A. It is therefore no longer necessary to use an insert as in the first embodiment, and the cross section of the channels 6 can thus be substantially increased without significantly increasing the thickness of the panel 1. It should be noted that, by virtue of the use of the second plate 2A as the external layer of the global perforated plate, the thickness a of the internal layer formed by the plate 2 situated above the cavities 31 can be reduced, or even zero, while the global perforated plate keeps a sufficient thickness.

Figure 8:
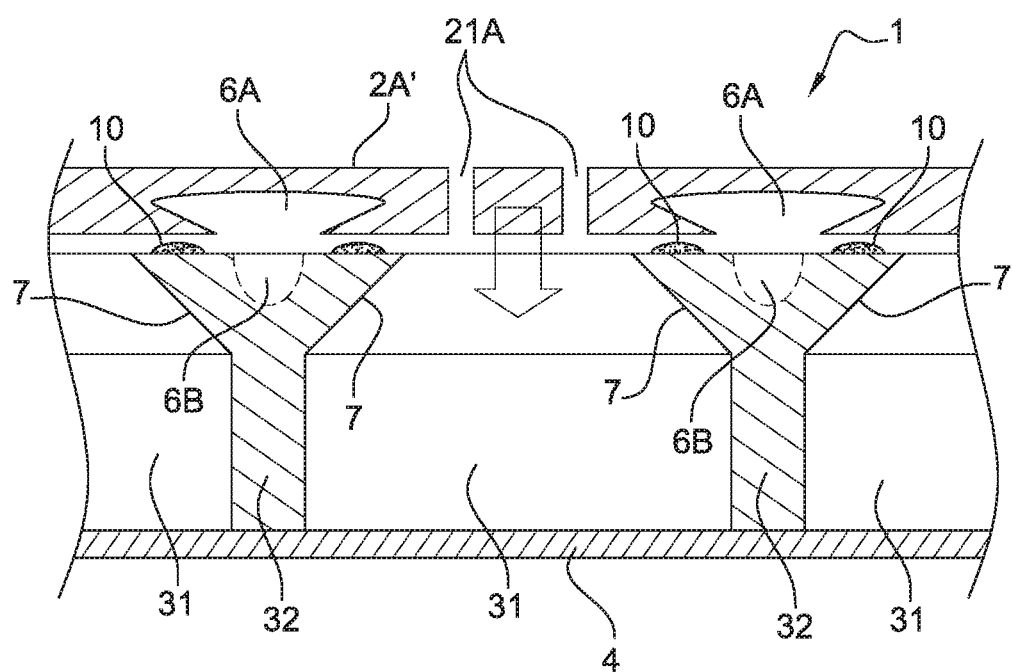
FIG. 8 is a detailed cross-sectional view of still another embodiment illustrating of a step of manufacture of a fluid circulation channel in a heat-exchange and noise-reduction panel according to an aspect of the present disclosure.

In a third embodiment, as illustrated in FIGS. 7A and 7B, a second perforated plate 2A is also used, that is to say an external layer of the global perforated plate, which is fixed to the internal layer formed by the plate 2. This second plate 2A is nevertheless thicker than in the second embodiment and also comprises grooves 6A designed so as to form a portion of the fluid circulation channels 6. The fluid circulation channels 6 thus comprise a portion 6B formed in the thickened end of the wall 32 and in the plate 2, in the longitudinal extension of the thickened end. Said channels also comprise a portion 6A formed in the second plate 2A, in the longitudinal extension of the thickened end of the wall 32. The second plate 2A may be formed of a material lighter than aluminum, optionally flexible, and nevertheless having a good heat-exchange capability. The greater thickness of said plate makes it possible to increase the length L of the openings 21, 21A forming the necks of the resonators, as well as the cross section of flow of the fluid circulation channels 6, all while having a minimum impact on the mass of the assembly. The greater length of the openings 21, 21A forming the necks of the resonators makes it possible, for a given frequency of a resonator, to reduce the overall size of the air cavity of the resonator. As in the second embodiment, the thickness a of the plate 2 situated above the cavities 31 may be reduced, or even zero. FIG. 8 illustrates the case where the thickness a of the plate 2 is zero. In this case, the global perforated plate is formed by a perforated external plate 2A' that is fixed, for example by bonding by means of an adhesive 10 or by brazing, on the thickened ends of the walls 32 of the cellular structure 3. The external plate 2A' comprises grooves 6A designed so as to form all or a portion of the fluid circulation channels 6. Grooves 6B forming another portion of the fluid circulation channels can be produced or not in the flared parts of the walls 32.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A heat-exchange and noise-reduction panel for a propulsion assembly, the panel comprising:
   a perforated plate comprising a plurality of through-openings;
   a cellular structure comprising structural walls which are longitudinally oriented and which are covered directly by said perforated plate, wherein each of said structural walls extends substantially perpendicularly to the perforated plate, wherein each of said structural walls comprises a first end and a second end opposed to said first end, wherein the first end is thickened and flared in a cross section,
   said cellular structure further comprising cavities which are located between said structural walls, and which define Helmholtz resonators,
   said plurality of through-openings forming necks of said resonators; and
   fluid circulation channels formed at least in part directly into a thickness of the first end of said structural walls, on a same side as said perforated plate.

2. The panel according to claim 1, wherein fluid to be circulated in the fluid circulation channels includes oil or heat-transfer fluid.

3. The panel according to claim 1, wherein the fluid circulation channels are formed in part by grooves opening towards the outside of the cellular structure and produced at least in part in the thickness of the first end of said structural walls.

4. The panel according to claim 3, wherein the grooves forming the fluid circulation channels are closed by attached elements that are fixed to the thickness of the first end of said structural walls, on a side opposite said cellular structure.

5. The panel according to claim 4, wherein the attached elements comprise inserts that are engaged in the channels and fixed to the perforated plate.

6. The panel according to claim 5, wherein said inserts are fixed to the perforated plate by welding.

7. The panel according to claim 1, wherein the cellular structure and at least part of the perforated plate are formed in a single piece.

8. The panel according to claim 7, wherein an internal layer of the perforated plate is formed in a single piece with the cellular structure, and the perforated plate further comprises a perforated external layer that is fixed to said internal layer, wherein said perforated external layer comprises openings which are aligned with said plurality of through-openings of said internal layer of the perforated plate.

9. The panel according to claim 8, wherein said perforated external layer is fixed to said internal layer by adhesive bonding or brazing.

10. The panel according to claim 8, wherein said perforated external layer, or a perforated external plate, comprises grooves that face the cellular structure and define at least a portion of said channels.

11. The panel according to claim 8, wherein said perforated external layer, or said perforated plate, is produced from a flexible material.

12. The panel according to claim 11, wherein the flexible material comprises a heat-conducting and/or a metal material.

13. The panel according to claim 7, wherein the perforated plate and the cellular structure are formed in a single machined metal block.

14. The panel according to claim 1, wherein the perforated plate is formed by a perforated external plate that is fixed to the cellular structure.

15. The panel according to claim 14, wherein said perforated external plate is fixed by adhesive bonding or brazing to the cellular structure.

16. The propulsion assembly comprising at least one of the panels according to claim 1.

17. A method for manufacturing the panel according to claim 1, comprising:
   forming said fluid circulation channels, at least in part in the thickness of the first end of said structural walls, on the same side as said perforated plate, and/or at least in part in regions of the perforated plate situated in the longitudinal extension of the thickness of the first end.

18. The method according to claim 17, comprising:
   forming the perforated plate and the cellular structure in a single piece by an additive manufacturing process, wherein the formation of the fluid channels in the thickness of the first end of said structural walls occurs during the additive manufacturing process.

19. The method according to claim 17, comprising:
   forming the perforated plate and the cellular structure in a single block;
   producing said fluid circulation channels, by removal of material, on a face of the plate situated on an opposite side to the cellular structure; and
   attaching or fixing to said plate one or more elements for closure of the channels.

20. The method according to claim 19, wherein said forming the perforated plate and the cellular structure in the single block includes
   forming the perforated plate and the cellular structure in the single block by machining a block of material.

21. The panel according to claim 1, wherein the cellular structure is sandwiched directly between the perforated plate and a support structure of the panel, said support structure being opposed to said perforated plate.

22. The panel according to claim 21, wherein the support structure is an air inlet casing or a fan casing of a turbine engine of the propulsion assembly.

23. The panel according to claim 1, wherein the thickness of the first end of said structural walls form substantially a bevel under the perforated plate and on each side of the structural walls.

24. The panel according to claim 1, wherein each of said structural walls comprises, at the first end situated on the same side of the perforated plate, a top portion in which the thickness of the first end of the structural wall increases in a direction of the perforated plate.

25. Heat-exchange and noise-reduction panel for a propulsion assembly, the panel comprising:
   a perforated plate comprising a plurality of through-openings;
   a cellular structure comprising structural walls which are longitudinally oriented and which are covered by said perforated plate, wherein each of said structural walls extends substantially perpendicularly to the perforated plate, wherein each of said structural walls comprises a first end and a second end opposed to said first end;
   said cellular structure further comprising cavities which are located between said structural walls, and which define Helmholtz resonators;

said plurality of through-openings forming necks of said resonators; and fluid circulation channels formed at least in part directly into a thickness of the first end of said structural walls, on a same side as said perforated plate, and/or at least in part in regions of the perforated plate situated in a longitudinal extension of the first ends of said structural walls, wherein each said structural walls comprises, at the first end situated on the same side of the perforated plate, a top portion in which the thickness of the first end of the structural wall increases in a direction of the perforated plate, and wherein the top portion of each structural wall of the cellular structure has a cross section substantially in the form of an isosceles trapezium.

* * * * *